(12) United States Patent
Tsai et al.

(10) Patent No.: US 8,169,887 B2
(45) Date of Patent: May 1, 2012

(54) APPARATUSES AND METHODS FOR WIRELESS COMMUNICATIONS USING A PERMUTATION SEQUENCE

(75) Inventors: Chia-Lung Tsai, Hsinchu (TW); Yu-Tao Hsieh, Hsinchu (TW); Pang-An Ting, Fongyuan (TW); Jen-Yuan Hsu, Jincheng Township (TW)

(73) Assignee: Industrial Technology Research Institute, Hsinchu (TW)

( * ) Notice: Subject to any disclaimer, the term of this patent is extended or adjusted under 35 U.S.C. 154(b) by 311 days.

(21) Appl. No.: 12/649,028

(22) Filed: Dec. 29, 2009

(65) Prior Publication Data

US 2011/0158185 A1   Jun. 30, 2011

(51) Int. Cl.
*H04J 11/00* (2006.01)
(52) U.S. Cl. ......... 370/203; 370/208; 370/210; 370/328
(58) Field of Classification Search .................. None
See application file for complete search history.

(56) References Cited

U.S. PATENT DOCUMENTS

| | | | | |
|---|---|---|---|---|
| 7,756,004 | B2* | 7/2010 | Ouyang et al. | 370/208 |
| 7,859,987 | B2* | 12/2010 | Ouyang et al. | 370/208 |
| 7,974,355 | B2* | 7/2011 | Palanki et al. | 375/260 |
| 7,974,362 | B2* | 7/2011 | Palanki et al. | 375/295 |
| 2007/0140103 | A1* | 6/2007 | Ouyang et al. | 370/208 |
| 2009/0147828 | A1* | 6/2009 | Palanki et al. | 375/130 |
| 2010/0005132 | A1* | 1/2010 | Choi et al. | 708/491 |
| 2010/0005133 | A1* | 1/2010 | Choi et al. | 708/491 |
| 2010/0046584 | A1* | 2/2010 | Palanki et al. | 375/134 |

OTHER PUBLICATIONS

Yu-Tao Hsieh et al., Modification on Random Sequence Generation Scheme in DL/UL PHY (AWD-15.3.5.3.3), IEEE 802.16 Presentation Submission, Document No. IEEE C802.16m-09/1593, Jul. 6, 2009.
Yu-Tao Hsieh et al., Random Sequence Generator Issue (AWD-15.3.8), IEEE 802.16 Presentation Submission, Document No. IEEE C80216m-09/1311r2, Jul. 15, 2009.

* cited by examiner

*Primary Examiner* — Bob Phunkulh
(74) *Attorney, Agent, or Firm* — Finnegan, Henderson, Farabow, Garrett & Dunner, LLP

(57) ABSTRACT

A method for data transmissions in a wireless communication system includes: allocating resources for data to be transmitted; providing a seed number from the communication system; setting, based on the seed number, at least one parameter for a pseudo-random mapper having an input variable and an output variable; initializing an array with a number of base elements; increasing a current value of the input variable by a current value of a counter; and calculating a value of the output variable based on the pseudo-random mapper and the increased value of the input variable. The method further includes: swapping a first base element and a second base element in the array, the first base element being identified based on the current value of the counter, and the second base element being identified based on the value of the output variable; performing permutation on the resources by using the array as a permutation sequence; and transmitting the data.

30 Claims, 7 Drawing Sheets

APPARATUSES AND METHODS FOR WIRELESS COMMUNICATIONS USING A PERMUTATION SEQUENCE

TECHNICAL FIELD

This disclosure relates to apparatuses and methods for wireless communications using a permutation sequence.

BACKGROUND

Wireless communication techniques based on multiple subcarriers, such as an orthogonal frequency-division multiplexing (OFDM) technique, are gaining worldwide popularity due to their broad applications. For example, an OFDM based communication system may be used in a plurality of networks including Worldwide Interoperability for Microwave Access (WiMax) networks, Wireless Fidelity (Wi-Fi) networks, Wireless Broadband (WiBro) networks, etc.

The OFDM technique uses a plurality of closely-spaced orthogonal subcarriers to carry data. For example, the data may be allocated on a plurality of parallel data channels, one for each of the subcarriers. Each of the subcarriers may be modulated with a conventional modulation scheme, e.g., quadrature amplitude modulation, at a relatively low symbol rate. In addition, based on the OFDM technique, an inverse fast Fourier transform (IFFT) may be performed on OFDM symbols representing the data on a transmitting side, and a fast Fourier transform (FFT) may be performed to recover the OFDM symbols on a receiving side.

Signals including the OFDM symbols are transmitted through a communication channel from the transmitting side to the receiving side. In reality, the communication channel may have an effect on the signals when the signals are transmitted through the communication channel. For example, when propagating through the communication channel, the signals may be significantly attenuated at a certain frequency band or a certain period of time. As a result, data transmission may suffer from channel fading at the frequency band or the period of time, and reliability of data transmission may be reduced.

To enhance the reliability of data transmission, traditional resource randomization methods have been used to provide time and frequency diversity, and to average out interference signals from the transmitting side. For example, for a base station and a mobile station that are configured to communicate based on IEEE 802.16m standard, resource randomization may be performed at different levels of granularity, such as a tile level or a resource unit level. As a result of the resource randomization, data that would otherwise be transmitted at adjacent time or frequency resources may be transmitted at nonadjacent time or frequency resources. Such transmission may provide time and frequency diversity and reduce signal interference. Accordingly, the reliability of data transmission may be enhanced.

Data transmission with a relatively long transmission time interval (TTI) may call for or be improved by resource randomization methods that may provide time and frequency diversity. For the purpose of illustration, TTI is a parameter relating to encapsulation of data from higher layers into frames for transmission on a radio link layer and may refer to the length of an independently decodable transmission on a radio link.

SUMMARY

Consistent with the disclosed embodiments, there is provided a method for data transmissions in a wireless communication system. The method includes: allocating resources for data to be transmitted; providing a seed number from the communication system; setting, based on the seed number, at least one parameter for a pseudo-random mapper having an input variable and an output variable; initializing an array with a number of base elements; increasing a current value of the input variable by a current value of a counter; and calculating a value of the output variable based on the pseudo-random mapper and the increased value of the input variable. The method further includes: swapping a first base element and a second base element in the array, the first base element being identified based on the current value of the counter, and the second base element being identified based on the value of the output variable; performing permutation on the resources by using the array as a permutation sequence; and transmitting the data.

Consistent with the disclosed embodiments, there is provided an apparatus for data transmissions in a wireless communication system. The apparatus includes: an input interface for receiving data to be transmitted; a processor coupled with the input interface, a memory device coupled with the processor for storing the data to be transmitted; and an output interface coupled with the processor to transmit the data. The processor is configured to allocate resources for data to be transmitted; provide a seed number from the communication system; set, based on the seed number, at least one parameter for a pseudo-random mapper having an input variable and an output variable; initialize an array with a number of base elements; increase a current value of the input variable by a current value of a counter; and calculate a value of the output variable based on the pseudo-random mapper and the increased value of the input variable. The processor is further configured to swap a first base element and a second base element in the array, the first base element being identified based on the current value of the counter, and the second base element being identified based on the value of the output variable; and perform permutation on the resources by using the array as a permutation sequence.

Consistent with the disclosed embodiments, there is provided a method for receiving data in a wireless communication system. The method includes: receiving data and a seed number from the communication system; setting, based on the seed number, at least one parameter for a pseudo-random mapper having an input variable and an output variable; initializing an array with a number of base elements; increasing a current value of the input variable by a current value of a counter; and calculating a value of the output variable based on the pseudo-random mapper and the increased value of the input variable. The method further includes: swapping a first base element and a second base element in the array, the first base element being identified based on the current value of the counter, and the second base element being identified based on the value of the output variable; performing permutation on resources allocated for the received data by using the array as a permutation sequence; and de-allocating the resources allocated for the received data.

Consistent with the disclosed embodiments, there is provided an apparatus for receiving data in a wireless communication system. The apparatus includes: a receiving interface for receiving data and a seed number from the communication system; a processor coupled with the receiving interface; a memory device coupled with the processor for storing the received data; and an output interface coupled with the processor to output the received data for further processing. The processor is configured to set, based on the seed number, at least one parameter for a pseudo-random mapper having an input variable and an output variable; initialize an array with a number of base elements; increase a current value of the input variable by a current value of a counter; and calculate a value of the output variable based on the pseudo-random mapper and the increased value of the input variable. The processor is further configured to swap a first base element and a second base element in the array, the first base element being identified based on the current value of the counter, and the second base element being identified based on the value of the output variable; perform permutation on resources allocated for the received data by using the array as a permutation sequence; and de-allocate the resources allocated for the received data.

Consistent with the disclosed embodiments, there is provided a method for data transmissions in a wireless communication system. The method includes: allocating resources for data to be transmitted; initializing an array with a number of base elements, the array having a plurality of indexes each corresponding to a location in the array; selecting a first set of indexes from the plurality of indexes; selecting a second set of indexes from the plurality of indexes; randomly or regularly determining a first index from the first set of indexes; and randomly determining a second index from the second set of indexes. The method further includes: swapping a first base element and a second base element in the array, the first base element being identified based on the first index, and the second base element being identified based on the second index; performing permutation on the allocated resources by using the array as a permutation sequence; and transmitting the data.

Consistent with the disclosed embodiments, there is provided method for receiving data in a wireless communication system. The method includes: receiving data; initializing an array with a number of base elements, the array having a plurality of indexes each corresponding to a location in the array; selecting a first set of indexes from the plurality of indexes; selecting a second set of indexes from the plurality of indexes; randomly or regularly determining a first index from the first set of indexes; and randomly determining a second index from the second set of indexes. The method further includes: swapping a first base element and a second base element in the array, the first base element being identified based on the first index, and the second base element being identified based on the second index; performing permutation on resources allocated for the received data by using the array as a permutation sequence; and de-allocating the resources allocated for the received data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings, and the same numbers in different drawings represent the same or similar elements unless otherwise represented.

Exemplary embodiments provide apparatuses, such as a base station or a mobile station, and methods for wireless communications using a generated permutation sequence. In one example, the base station may allocate time and/or frequency resources for data to be transmitted, perform permutation on the resources according to the generated permutation sequence, and then transmit the data. In another example, the mobile station may perform permutation on time and/or frequency resources allocated for received data according to the generated permutation sequence, and de-allocate the resources allocated for the received data. The apparatuses may operate based on one or more standards, such as the IEEE 802.16 family of standards, the 3rd Generation Partnership Project (3GPP) standard, the High-Speed Packet Access (HSPA) standard, the Long Term Evolution (LTE) standard, etc.

Figure 1:
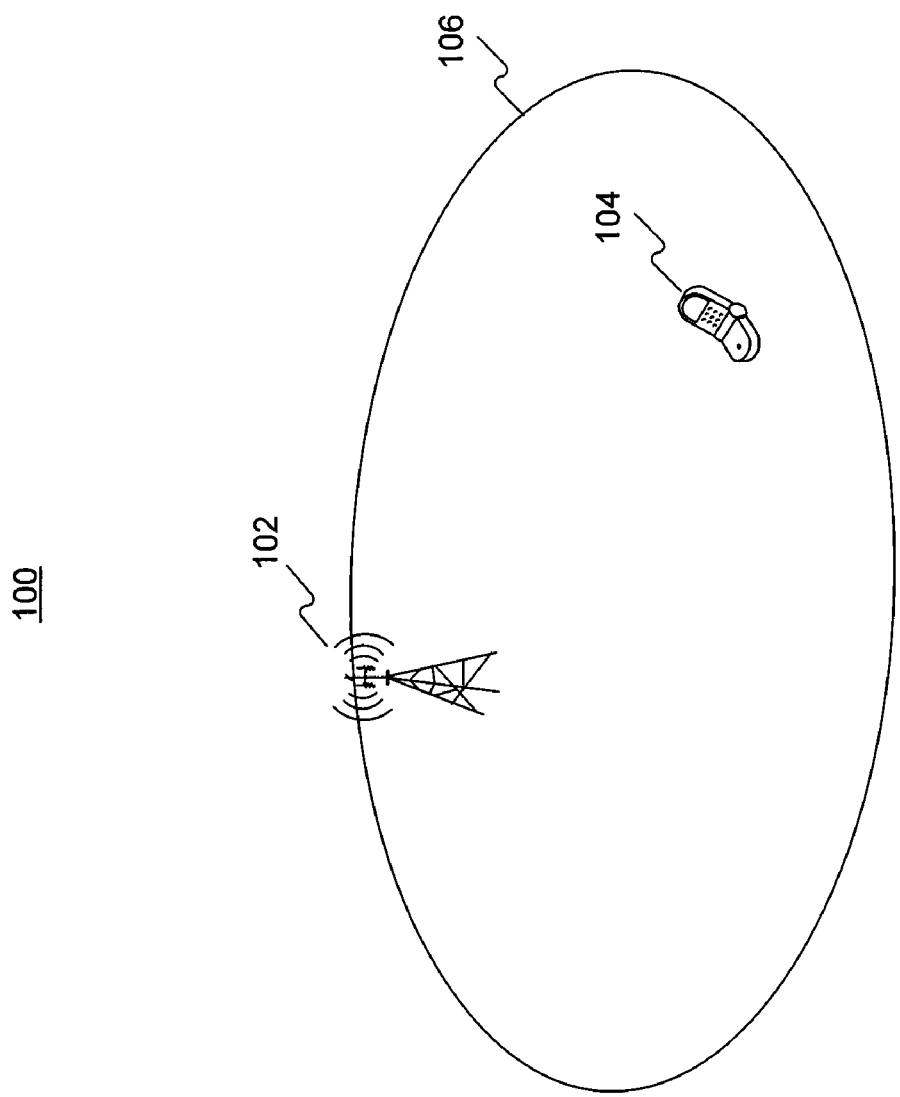
FIG. 1 illustrates a wireless communication system consistent with an exemplary embodiment.

FIG. 1 illustrates a wireless communication system 100 consistent with an exemplary embodiment. As an example, the communication system 100 may include a base station 102 and a mobile station 104. The mobile station 102 is within a coverage area 106, also known as a cell, of the base station 102.

In exemplary embodiments, the base station 102 and the mobile station 104 may be configured to communicate using the orthogonal frequency-division multiplexing (OFDM) technique for data transmissions. For example, when the base station 102 transmits data to the mobile station 104, the data to be transmitted may be allocated on a plurality of parallel data channels, one for each of a plurality of subcarriers of the base station 102. Each of the subcarriers may be modulated with a modulation scheme, such as quadrature amplitude modulation, at a relatively low symbol rate. In addition, an inverse fast Fourier transform (IFFT) may be performed on OFDM symbols representing the data at the base station 102, and a fast Fourier transform (FFT) may be performed to recover the OFDM symbols at the mobile station 104.

In exemplary embodiments, the base station 102 and the mobile station 104 each may be configured to generate a permutation sequence, using methods described below. The base station 102 may allocate time and/or frequency resources for data to be transmitted, perform permutation on the resources according to the generated permutation sequence, and then transmit the data. The mobile station 104 may also perform permutation on time and/or frequency resources allocated for received data according to the generated permutation sequence, and de-allocate the resources allocated for the received data.

The generated permutation sequence may be a random sequence to indicate a permutation pattern for communication between the base station 102 and the mobile station 104. Permutation of time and/or frequency resources may shuffle the time and/or frequency resources at a granularity level, such as a tile level or a resource unit level, in a random manner such that originally adjacent bits/symbols may be set further apart after the permutation. As a result, time and/or frequency diversity may be achieved for the data to be transmitted, and signal interference may be reduced in some embodiments.

Figure 2:
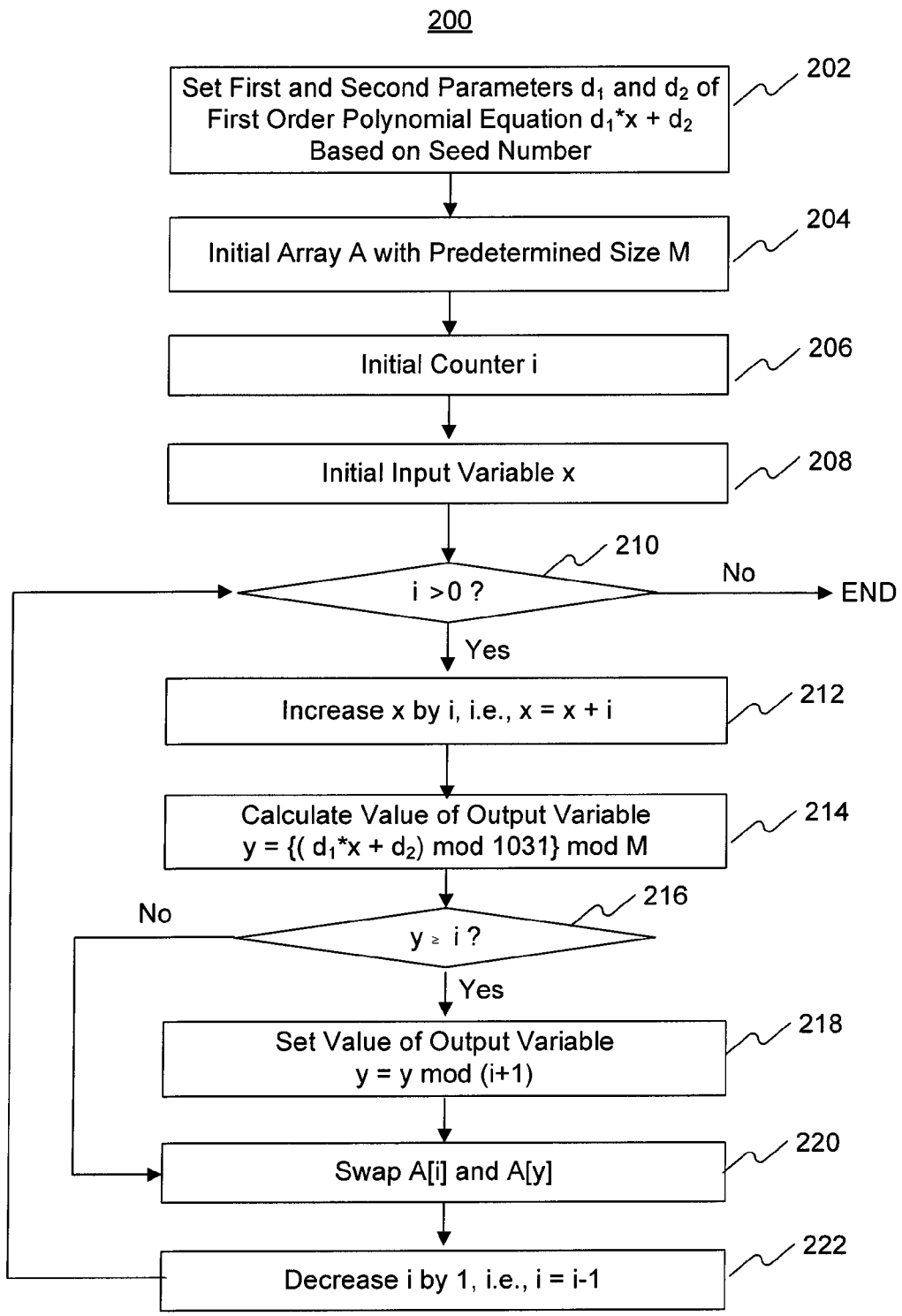
FIG. 2 illustrates a flowchart of a method for an apparatus to generate a permutation sequence consistent with an exemplary embodiment.

FIG. 2 illustrates a flowchart of a method 200 for generating a permutation sequence consistent with an exemplary embodiment. The method 200 may be implemented in various apparatuses, such as the base station 102 or the mobile station 104 identified in FIG. 1.

Referring to FIG. 2, in exemplary embodiments, an apparatus may set first and second parameters $d_1$ and $d_2$ of a first order polynomial equation $d_1*x+d_2$ based on a seed number (202), where x is an input variable. The seed number may have a plurality of binary bits for representing a value SEED. For example, the seed number may have 10 binary bits, such as having "0000000010" for the value 2, i.e., SEED=2.

In exemplary embodiments, the first and second parameters $d_1$ and $d_2$ may be set as flows: $d_1$=floor $(SEED/2^5)+619$, and $d_2$=SEED mod $2^5$, where "floor" denotes a floor operation and "mod" denotes a modulo operation.

In exemplary embodiments, the seed number may be determined based on a cell identification corresponding to the apparatus. For example, if the apparatus is a base station, the cell identification corresponding to the apparatus is an identification of a cell covered by the base station. Also for example, if the apparatus is a mobile station, the cell identification corresponding to the apparatus is an identification of a cell covered by a base station with which the mobile station communicates.

In exemplary embodiments, the apparatus may also initialize an array A with a number of base elements, e.g., a predetermined size M, based on a plurality of indexes 0, 1, ..., and M−1 for the base elements (204). As described above, the apparatus may perform permutation on time and/or frequency resources at a granularity level, such as a subcarrier level, a tile level, or a resource unit level. Accordingly, for example, the apparatus may initializes the array A with the size M equal to a number of resource units to be permuted.

In exemplary embodiments, the apparatus may initialize the array A as follows: A[0]=0, A[1]=1, ..., and A[M−1]=M−1, where A[j] (j=0, 1, ..., or M−1) denotes a $j^{th}$ base element of the array A. In addition, the apparatus initializes a counter i to have an initial value, e.g., M−1 (206), and initializes the input variable x to have an initial value, e.g., −1 (208).

Next, the apparatus may determine whether or not a current value of the counter i is larger than zero (210). If the apparatus determines that the current value of the counter i is larger than zero (210—Yes), the apparatus increases the current value of the input variable x by a current value of the counter i (212), i.e., x=x+i, and calculates a value of an output variable y using a pseudo-random mapper that includes the first order polynomial equation $d_1*x+d_2$, e.g., y={$(d_1*x+d_2)$ mod 1031} mod M, where "mod" denotes a modulo operation (214). Otherwise (210—No), the process of generating the permutation sequence is finished.

The apparatus may further determine whether or not the calculated value of the output variable y is larger than, or equal to, the current value of the counter i (216). If the apparatus determines that the calculated value of the output variable y is not larger than, or equal to, the current value of the counter i (216—No), the apparatus may swap the base element A[i] and the base element A[y] in the array A (220). Otherwise (216—Yes), the apparatus sets the value of the output variable y as follows: y=y mod (i+1), where "mod" denotes a modulo operation (218), and then swaps the base element A[i] and the base element A[y] in the array A (220).

The apparatus further updates the counter i by decreasing the current value of the counter i by one, i.e., i=i−1 (222).

Next, the apparatus may repeat steps 210-222, until the apparatus determines that the current value of the counter i is not larger than zero (210—No). The apparatus may then use the array A as the generated permutation sequence, and the process of generating the permutation sequence is finished.

Figure 3:
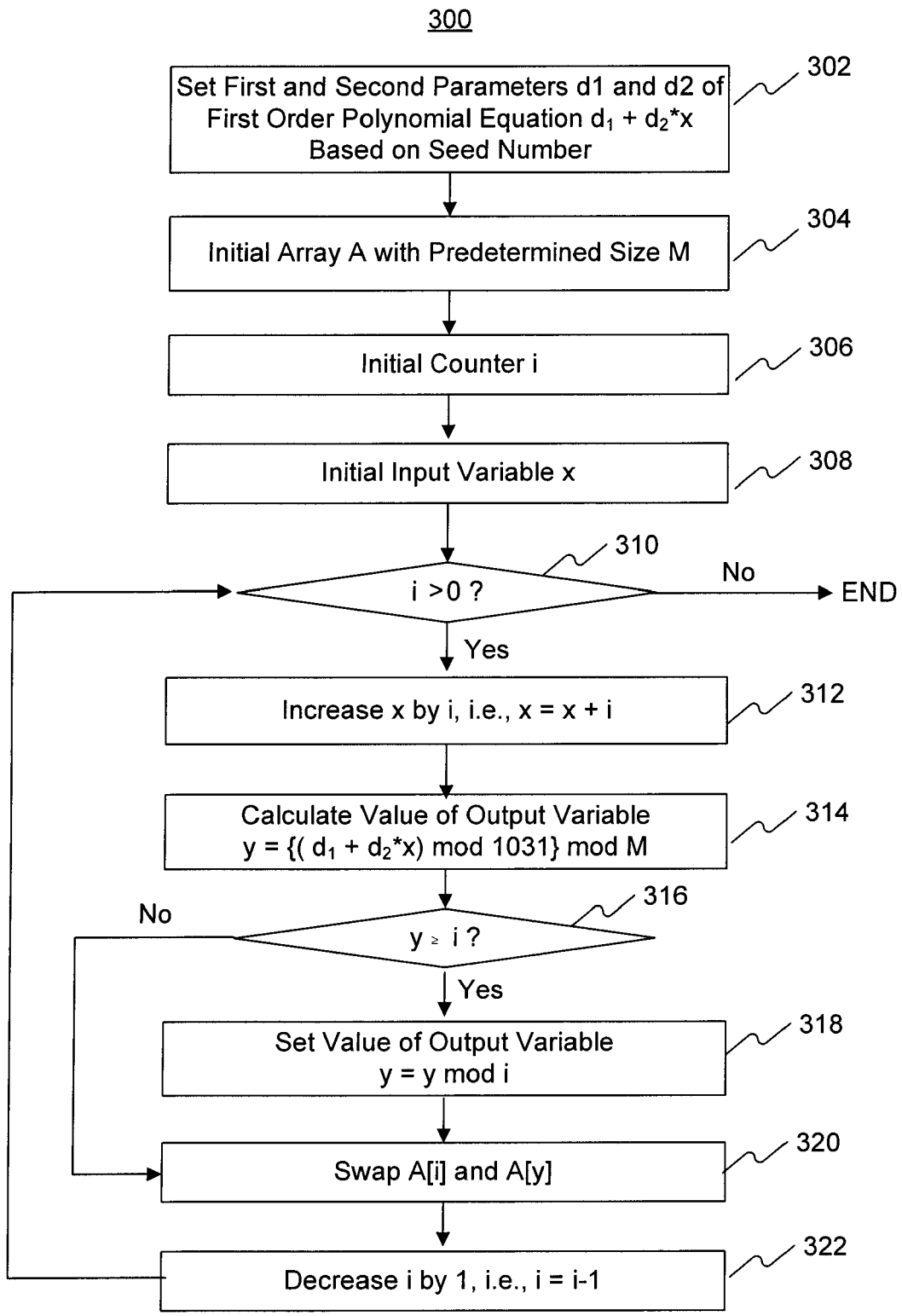
FIG. 3 illustrates a flowchart of a method for an apparatus to generate a permutation sequence consistent with an exemplary embodiment.

FIG. 3 illustrates a flowchart of a method 300 for generating a permutation sequence consistent with an exemplary embodiment. The method 300 may be implemented in various apparatuses, such as the base station 102 or the mobile station 104 identified in FIG. 1.

Referring to FIG. 3, in exemplary embodiments, an apparatus may set first and second parameters $d_1$ and $d_2$ of a first order polynomial equation $d_1+d_2*x$ based on a seed number (302), where x is an input variable. The seed number may have a plurality of binary bits for representing a value SEED. For example, the seed number may have 10 binary bits, such as having "0000000010" for the value 2, i.e., SEED=2.

In exemplary embodiments, the first and second parameters $d_1$ and $d_2$ may be set as flows: $d_1$=floor $(SEED/2^5)+1$, and $d_2$ =SEED mod $2^5$, where "floor" denotes a floor operation and "mod" denotes a modulo operation.

In exemplary embodiments, the seed number may be determined based on a cell identification corresponding to the apparatus. For example, if the apparatus is a base station, the cell identification corresponding to the apparatus is an identification of a cell covered by the base station. Also for example, if the apparatus is a mobile station, the cell identification corresponding to the apparatus is an identification of a cell covered by a base station with which the mobile station communicates.

In exemplary embodiments, the apparatus may also initialize an array A with a number of base elements, e.g., a predetermined size M, based on a plurality of indexes 0, 1, ..., and M−1 for the base elements (304). As described above, the apparatus may perform permutation on time and/or frequency resources at a granularity level, such as a subcarrier level, a tile level, or a resource unit level. Accordingly, for example, the apparatus may initializes the array A with the size M equal to a number of resource units to be permuted.

In exemplary embodiments, the apparatus may initialize the array A as follows: A[0]=0, A[1]=1, ..., and A[M−1]=M−1, where A[j] (j=0, 1, ..., or M−1) denotes a $j^{th}$ base element of the array A. In addition, the apparatus initializes a counter i to have an initial value, e.g., M−1 (306), and initializes the input variable x to have an initial value, e.g., −1 (308).

Next, the apparatus may determine whether or not a current value of the counter i is larger than zero (310). If the apparatus determines that the current value of the counter i is larger than zero (310—Yes), the apparatus increases the current value of the input variable x by a current value of the counter i (312), i.e., x=x+i, and calculates a value of an output variable y using a pseudo-random mapper that includes the first order polynomial equation $d_1+d_2*x$, e.g., y={$(d_1+d_2*x)$ mod 1031} mod M, where "mod" denotes a modulo operation (314). Otherwise (310—No), the process of generating the permutation sequence is finished.

The apparatus may further determine whether or not the calculated value of the output variable y is larger than, or equal to, the current value of the counter i (316). If the apparatus determines that the calculated value of the output variable y is not larger than, or equal to, the current value of the counter i (316—No), the apparatus may swap the base element A[i] and the base element A[y] in the array A (320). Otherwise (316—Yes), the apparatus sets the value of the output variable y as follows: y=y mod i, where "mod" denotes a modulo operation (318), and then swaps the base element A[i] and the element A[y] in the array A (320). The apparatus further updates the counter i by decreasing the current value of the counter i by one, i.e., i=i−1 (322).

Next, the apparatus may repeat steps 310-322, until the apparatus determines that the current value of the counter i is not larger than zero (310—No). The apparatus may then output the array A as the generated permutation sequence, and the process of generating the permutation sequence is finished.

In the above exemplary embodiments, the counter i is initialized to have the value M−1, and is decreased by one in the step 222 (FIG. 2) or the step 322 (FIG. 3). Accordingly, during the process of generating the permutation sequence, the value of the counter i changed from M−1, to M−2, to M−3, . . . , and to 0. In addition, the value of the output variable y is determined based on the pseudo-random mapper and the input variable x. As a result, in the method 200 (FIG. 2) or the method 300 (FIG. 3), the index for the base element A[i], i.e., the value of the counter i, is regularly determined, while the index for the base element A[y], i.e., the value of the output variable y, is pseudo-randomly determined.

In exemplary embodiments, the value of the counter i to be used in the process of generating the permutation sequence may also be determined based on a fixed number. For example, if M=10, the value of the counter i to be used may be determined to sequentially be one of the indexes 9, 7, 5, 3, 1, or to sequentially be one of the indexes 9, 7, 5, 3, 1, 8, 6, 4, 2, 0. In other words, the difference between two consecutive values may be a fixed number such as two. When the counter is updated, the current value of the counter may be decreased by the fixed number. Also for example, the value of the counter i to be used in the process of generating the permutation sequence may be updated based on a lookup table.

As described above, for generating a permutation sequence, an array A may be initialized with M base elements based on a plurality of indexes 0, 1, . . . , and M−1, each of the indexes 0, 1, . . . , and M−1 corresponding to a location in the array A. In exemplary embodiments, a permutation sequence may also be generated based on a first set of indexes selected from the indexes 0, 1, . . . , and M−1 and a second set of indexes also selected from the indexes 0, 1, . . . , and M−1. For example, the first set of indexes may be selected to include 0, 1, . . . , and 5, and the second set of indexes may be selected to include 6, 7, . . . , and M−1. Also for example, the first set of indexes may be selected to include 0, 1, . . . , and 7, and the second set of indexes may be selected to include 6, 7, . . . , and M−1. In other words, the first and second sets of indexes may or may not overlap.

In exemplary embodiments, a first index may be randomly determined from the first set of indexes, and a second index may be randomly determined from the second set of indexes. A first base element in the array A corresponding to the first index may then be swapped with a second base element in the array A corresponding to the second index. As the above process is repeated for a predetermined number of times, the array A may be outputted as the generated permutation sequence.

Figure 4A:
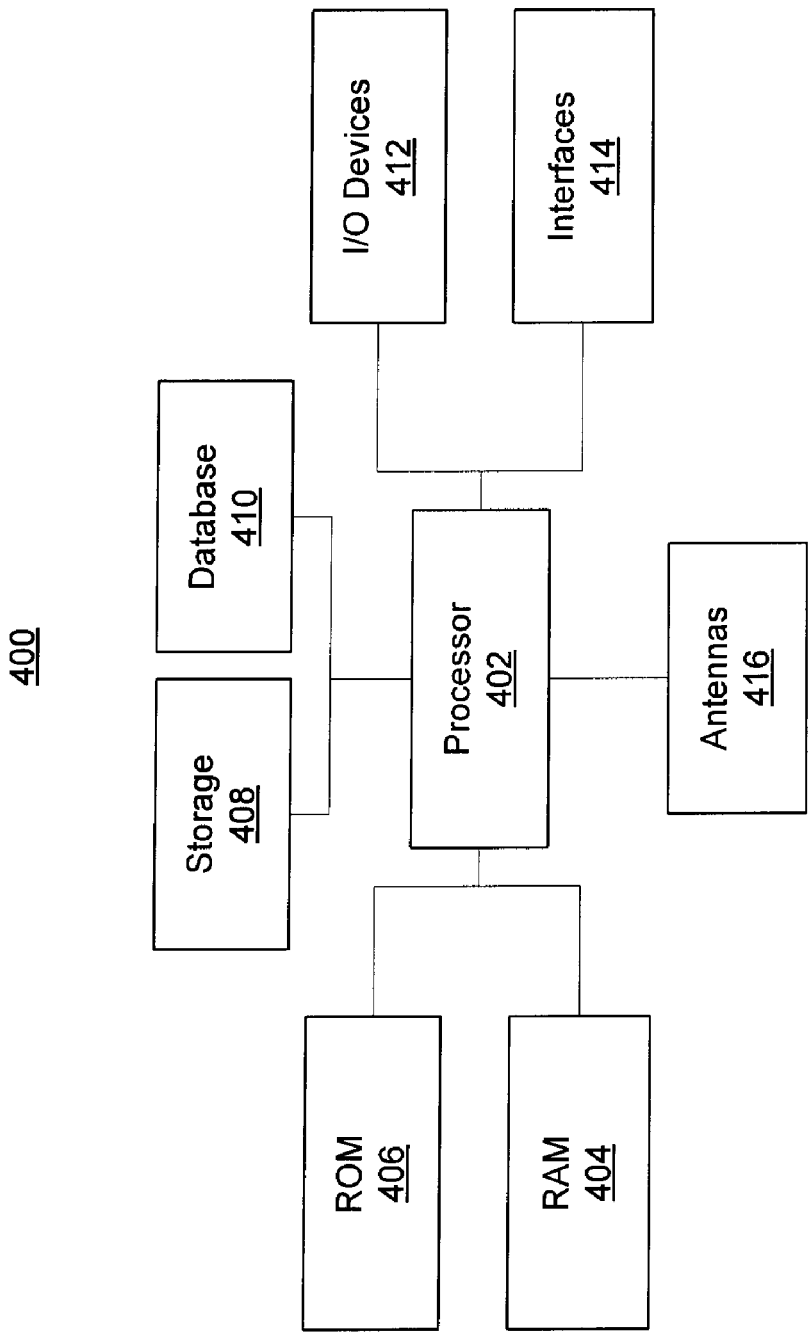
FIG. 4A illustrates a block diagram of a base station consistent with an exemplary embodiment.

FIG. 4A illustrates a block diagram of a base station 400 consistent with an exemplary embodiment. For example, the base station 400 may be the base station 102 (FIG. 1). Referring to FIG. 4A, the base station 400 may include one or more of the following components: a processor 402 configured to execute computer program instructions to perform various processes and methods, random access memory (RAM) 404 and read only memory (ROM) 406 coupled to the processor 402 and configured to access and store information and computer program instructions, a storage 408 coupled to the processor 402 and configured to store data and information, a database 410 coupled to the processor 402 and configured to store tables, lists, or other data structures, I/O devices 412, interfaces 414, antennas 416, etc. In some embodiments, storage 408 and database 410 may be combined or co-exist in one storage device or one memory device. In one embodiment, the interfaces 414 may include an input interface for receiving data to be transmitted and an output interface for transmitting the data. The input interface and the output interface may be coupled directly or indirectly with the processor 402. In some embodiments, the combination of the interfaces 414, the processor 402, and the storage 408 (or a memory device) may be used to implement some or all of the steps of the various embodiments disclosed.

In exemplary embodiments, the processor 402 of the base station 400 may be configured to execute computer program instructions to perform the method 200 (FIG. 2) or the method 300 (FIG. 3) to generate a permutation sequence. Based on the generated permutation sequence, the base station 400 may allocate time and/or frequency resources for data to be transmitted, perform permutation on the resources according to the generated permutation sequence, and then transmit the data.

Figure 4B:
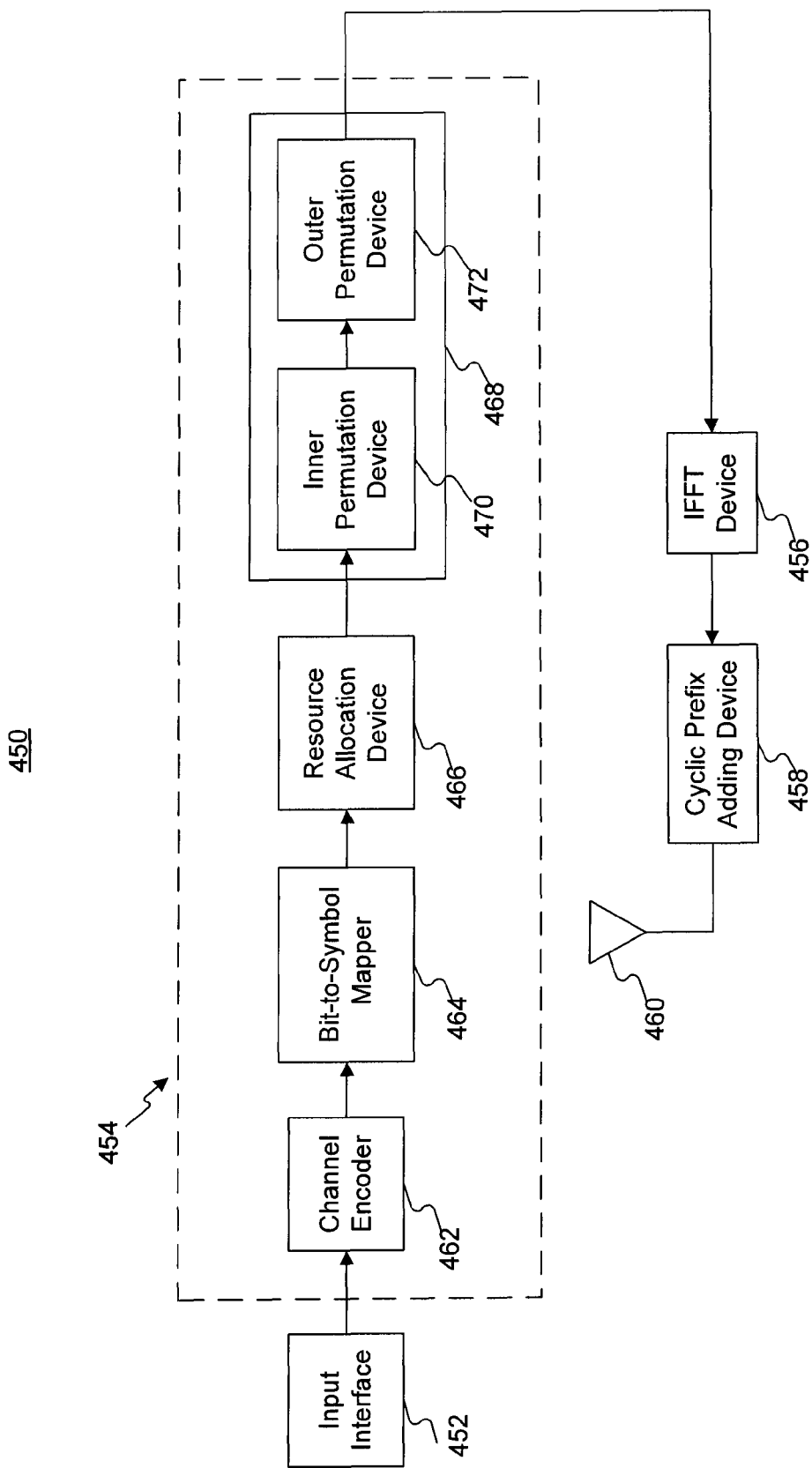
FIG. 4B illustrates a schematic diagram of a base station consistent with an exemplary embodiment.

FIG. 4B illustrates a schematic diagram of a base station 450 consistent with an exemplary embodiment. For example, the base station 450 may be the base station 102 (FIG. 1). Referring to FIG. 4B, the base station 450 may include an input interface 452, a coding device 454, an inverse fast Fourier transformation (IFFT) device 456, a cyclic prefix adding device 458, and an antenna 460.

In exemplary embodiments, the input interface 452 is configured to receive an input of a data stream, which may include a data sequence having uncoded data bits. The coding device 454 may then apply a coding to the data stream.

In one exemplary embodiment, the coding device 454 may include a channel encoder 462, a bit-to-symbol mapper 464, and a resource allocation device 468. The channel encoder 462 may receive the input data stream including uncoded data bits, and encode the data stream using suitable techniques, such as convolutional turbo coding or other coding techniques. Coded data bits may then be mapped into data symbols of a predetermined length by the bit-to-symbol mapper 464. The resource allocation device 468 may further distribute the data symbols onto subcarrier frequencies in frequency domain to form a number of logical resource units.

In one exemplary embodiment, the coding device 454 may further include a permutation device 468 configured to generate a permutation sequence according to the method 200 (FIG. 2) or the method 300 (FIG. 3), and apply a permutation to the data stream based on the permutation sequence. For example, the permutation device 468 may include an inner permutation device 470 and an outer permutation device 472. The inner permutation device 470 may be configured to perform an inner permutation to the data stream at a subcarrier level by permuting the subcarriers according to the permutation sequence, whereas the outer permutation device 472 may be configured to perform an outer permutation to the data stream at a resource unit level by permuting the resource units.

As shown in FIG. 4B, the inner permutation device 470 may first perform inner permutation to the data stream, and the outer permutation device 472 may then perform outer permutation to the data stream. Alternatively (not shown), the outer permutation device 472 may first perform outer permutation to the data stream, and the inner permutation device 470 may then perform inner permutation to the data stream. It is also contemplated that the permutation device 468 may not include separate inner and outer permutation devices, but instead, may include one single permutation module configured to perform both inner permutation and outer permutation.

In exemplary embodiments, a plurality of physical resource units may be formed after the logical resource units are permuted by the permutation device 468. The IFFT device 456 may then apply an IFFT to the permuted data stream, and the cyclic prefix adding device 458 may further add cyclic prefixes to the permuted data stream. The permuted data stream may be transmitted by the antenna 460.

Figure 5A:
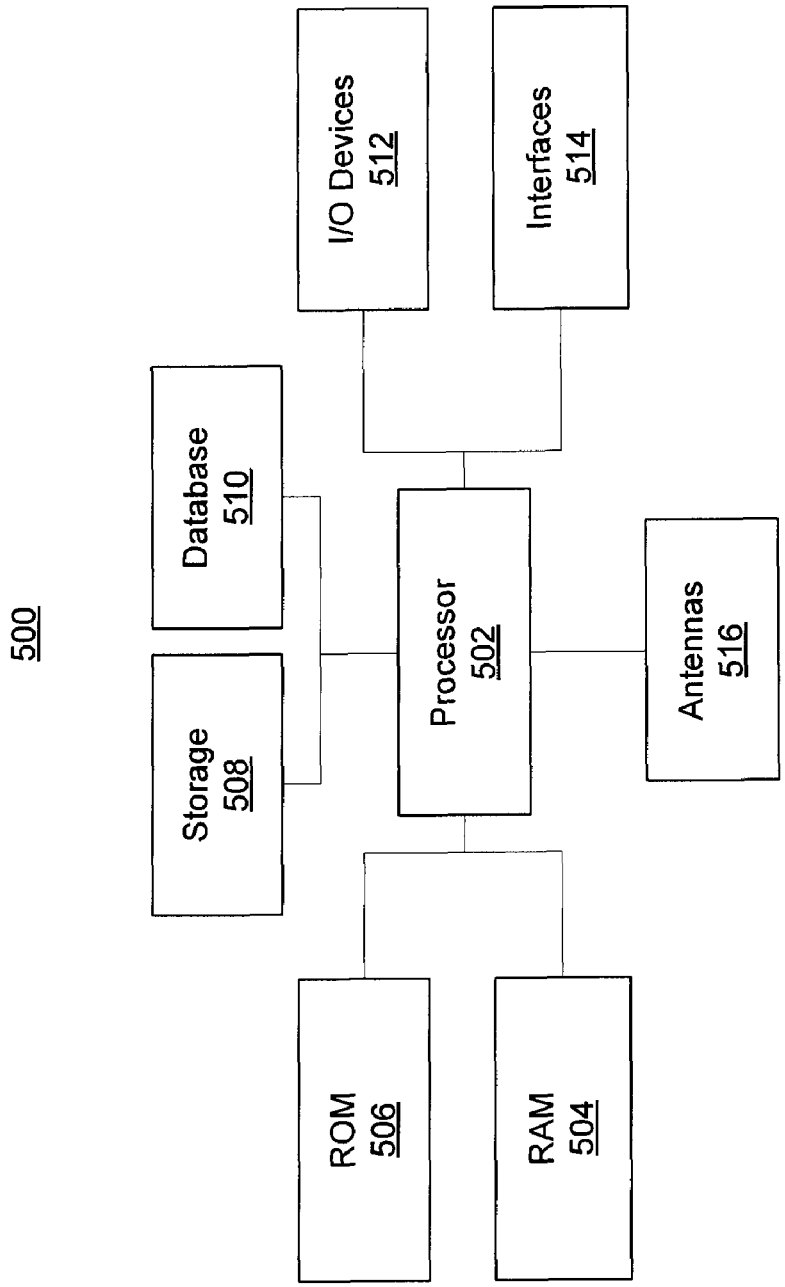
FIG. 5A illustrates a block diagram of a mobile station consistent with an exemplary embodiment.

FIG. 5A illustrates a block diagram of a mobile station 500 consistent with an exemplary embodiment. For example, the mobile station 500 may be the mobile station 104 (FIG. 1). Referring to FIG. 5A, the mobile station 500 may include one or more of the following components: a processor 502 configured to execute computer program instructions to perform various processes and methods, random access memory (RAM) 504 and read only memory (ROM) 506 coupled to the processor 502 and configured to access and store information and computer program instructions, storage 508 coupled to the processor 502 and configured to store data and information, a database 510 coupled to the processor 502 and configured to store tables, lists, or other data structures, I/O devices 512, interfaces 514, antennas 516, etc. In some embodiments, the storage 508 and the database 510 may be combined or co-exist in one storage device or one memory device. In one embodiment, the interfaces 514 may include a receiving interface for receiving data and an output interface for outputting the received data for further processing. The receiving interface and the output interface may be coupled directly or indirectly with the processor 502. In some embodiments, the combination of the interfaces 514, the processor 502, and the storage 508 (or a memory device) may be used to implement some or all of the steps of the various embodiments disclosed.

In exemplary embodiments, the processor 502 of the mobile station 500 may be configured to execute computer program instructions to perform the method 200 (FIG. 2) or the method 300 (FIG. 3) to generate a permutation sequence. Based on the generated permutation sequence, the mobile station 500 may perform permutation on time and/or frequency resources allocated for received data according to the generated permutation sequence, and de-allocate the resources allocated for the received data.

Figure 5B:
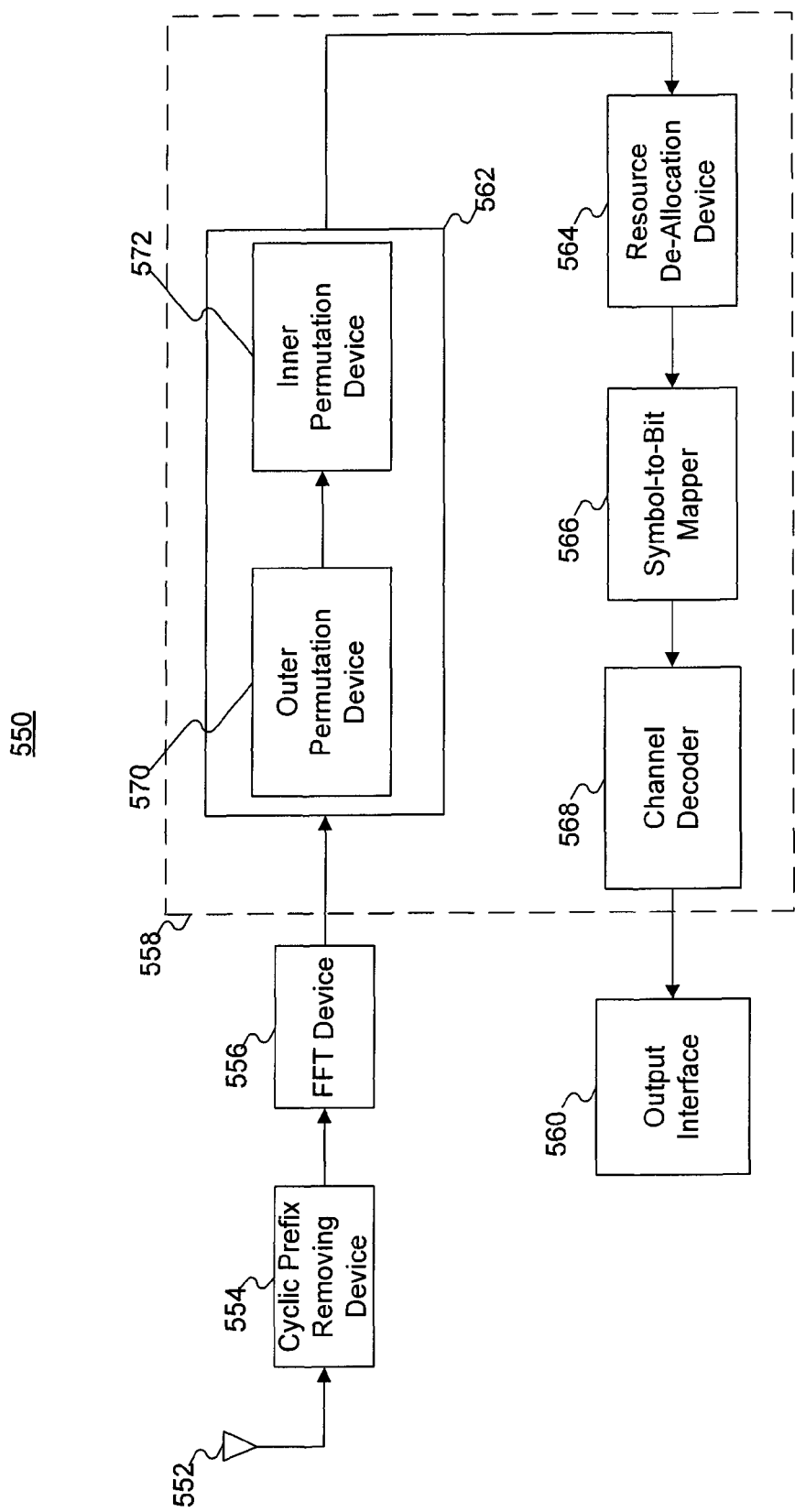
FIG. 5B illustrates a schematic diagram of a mobile station consistent with an exemplary embodiment.

FIG. 5B illustrates a schematic diagram of a mobile station 550 consistent with an exemplary embodiment. For example, the mobile station 550 may be the mobile station 104 (FIG. 1). Referring to FIG. 5B, the mobile station 550 may include an antenna 552, a cyclic prefix removing device 554, a fast Fourier transformation (FFT) device 556, a decoding device 558, and an output interface 560.

In exemplary embodiments, the antenna 552 is configured to receive a signal containing a data stream transmitted from a base station. The cyclic prefix removing device 554 is configured to remove cyclic prefixes from the data stream. The FFT device 556 may then apply an FFT to the data stream. The decoding device 558 may further perform decoding on the data stream.

In one exemplary embodiment, the decoding device 558 may include a permutation device 562 configured to generate a permutation sequence according to the method 200 (FIG. 2) or the method 300 (FIG. 3) and to perform permutation to the data stream based on the permutation sequence. For example, the permutation device 562 may include an outer permutation device 570 and an inner permutation device 572. The outer permutation device 570 may be configured to perform an outer permutation to the data stream at a resource unit level by permuting the resource units, whereas the inner permutation device 572 may be configured to perform an inner permutation to the data stream at a subcarrier level by permuting the subcarriers according to the permutation sequence.

As shown in FIG. 5B, the outer permutation device 570 may first perform outer permutation to the data stream, and the inner permutation device 572 may then perform inner permutation to the data stream. Alternatively (not shown), the inner permutation device 572 may first perform inner permutation to the data stream, and the outer permutation device 570 may then perform outer permutation to the data stream. It is also contemplated that the permutation device 562 may not include separate inner and outer permutation devices, but instead, may include one single permutation module configured to perform both inner permutation and outer permutation.

In one exemplary embodiment, the decoding device 558 may further include a resource de-allocation device 564, a symbol-to-bit mapper 566, and a channel decoder 568. After the permutation device 562 performs permutation to the data stream, the resource de-allocation device 564 may perform a process reverse to the resource allocation process performed at the base station that transmitted the data stream. Specifically, the resources allocated for the data stream at the base station may be de-allocated, and data symbols may be separated from the subcarrier frequencies to which the data symbols are allocated. The symbol-to-bit mapper 566 may then map the data symbols into data bits. The channel decoder 568 may further decode the data bits, such as by using convolutional turbo coding or other coding techniques. The decoded data bits may be output through the output interface 560 for further processing.

While embodiments have been described based on a base station, the invention is not so limited. It may be practiced with equal effectiveness with, e.g., a relay station or an access point.

While embodiments have been described based on a mobile station, the invention is not so limited. It may be practiced with equal effectiveness with, e.g., a subscriber station or a fixed station.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for data transmissions in a wireless communication system, comprising:
    allocating resources for data to be transmitted;
    providing a seed number from the communication system;
    setting, based on the seed number, at least one parameter for a pseudo-random mapper having an input variable and an output variable;
    initializing an array with a number of base elements;
    increasing a current value of the input variable by a current value of a counter;

calculating a value of the output variable based on the pseudo-random mapper and the increased value of the input variable;

swapping a first base element and a second base element in the array, the first base element being identified based on the current value of the counter, and the second base element being identified based on the value of the output variable;

performing permutation on the resources by using the array as a permutation sequence; and transmitting the data.

2. The method of claim 1, further comprising:

setting the value of the output variable based on the current value of the counter, if the calculated value of the output variable is no less than the current value of the counter.

3. The method of claim 1, further comprising:

repeating, based on an updated value of the counter, operations of increasing the current value of the input variable, calculating the value of the output variable, and swapping the first base element and the second base element.

4. The method of claim 1, wherein setting the at least one parameter comprises:

determining the seed number based on a cell identification.

5. The method of claim 1, further comprising:

updating the counter by decreasing the current value of the counter by a fixed number or by using a lookup table.

6. The method of claim 1, wherein initializing the array comprises:

initializing the array with the number of base elements equal to a number of resource units, subcarriers, or tiles on which the permutation is to be performed.

7. The method of claim 1, further comprising:

implementing the pseudo-random mapper as $y=\{(d_1 * x + d_2) \bmod 1031\} \bmod M$, or as $y=\{(d_1 + d_2 * x) \bmod 1031\} \bmod M$, wherein x is the input variable, y is the output variable, M is the number of base elements, and $d_1$ and $d_2$ are parameters determined based on a cell identification.

8. An apparatus for data transmissions in a wireless communication system, comprising:

an input interface for receiving data to be transmitted;

a processor coupled with the input interface, the processor being configured to:

allocate resources for data to be transmitted;

provide a seed number;

set, based on the seed number, at least one parameter for a pseudo-random mapper having an input variable and an output variable;

initialize an array with a number of base elements;

increase a current value of the input variable by a current value of a counter;

calculate a value of the output variable based on the pseudo-random mapper and the increased value of the input variable;

swap a first base element and a second base element in the array, the first base element being identified based on the current value of the counter, and the second base element being identified based on the value of the output variable; and perform permutation on the resources by using the array as a permutation sequence;

a memory device coupled with the processor for storing the data to be transmitted; and an output interface coupled with the processor to transmit the data.

9. The apparatus of claim 8, wherein the processor is further configured to:

set the value of the output variable based on the current value of the counter, if the calculated value of the output variable is no less than the current value of the counter.

10. The apparatus of claim 8, wherein the processor is further configured to:

repeat, based on an updated value of the counter, operations of increasing the current value of the input variable, calculating the value of the output variable, and swapping the first base element and the second base element.

11. The apparatus of claim 8, wherein the processor is further configured to:

determine the seed number based on a cell identification.

12. The apparatus of claim 8, wherein the processor is further configured to:

update the counter by decreasing the current value of the counter by a fixed number or by using a lookup table.

13. The apparatus of claim 8, wherein the processor is further configured to:

initialize the array with the number of base elements equal to a number of resource units, subcarriers, or tiles on which the permutation is to be performed.

14. The apparatus of claim 8, wherein the processor is further configured to:

implement the pseudo-random mapper as $y=\{(d_1 * x + d_2) \bmod 1031\} \bmod M$, or as $y=\{(d_1 + d_2 * x) \bmod 1031\} \bmod M$, wherein x is the input variable, y is the output variable, M is the number of base elements, and $d_1$ and $d_2$ are parameters determined based on a cell identification.

15. The apparatus of claim 8, being a base station, a relay station, or an access point.

16. A method for receiving data in a wireless communication system, comprising:

receiving data and a seed number from the communication system;

setting, based on the seed number, at least one parameter for a pseudo-random mapper having an input variable and an output variable;

initializing an array with a number of base elements;

increasing a current value of the input variable by a current value of a counter;

calculating a value of the output variable based on the pseudo-random mapper and the increased value of the input variable;

swapping a first base element and a second base element in the array, the first base element being identified based on the current value of the counter, and the second base element being identified based on the value of the output variable;

performing permutation on resources allocated for the received data by using the array as a permutation sequence; and de-allocating the resources allocated for the received data.

17. The method of claim 16, further comprising:

setting the value of the output variable based on the current value of the counter, if the calculated value of the output variable is no less than the current value of the counter.

18. The method of claim 16, further comprising:

repeating, based on an updated value of the counter, operations of increasing the current value of the input variable, calculating the value of the output variable, and swapping the first base element and the second base element.

19. The method of claim 16, further comprising:

updating the counter by decreasing the current value of the counter by a fixed number or by using a lookup table.

20. The method of claim 16, wherein initializing the array comprises:

initializing the array with the number of base elements equal to a number of resource units, subcarriers, or tiles on which the permutation is to be performed.

21. The method of claim 16, further comprising:
implementing the pseudo-random mapper as $y=\{(d_1*x+d_2) \bmod 1031\} \bmod M$, or as $y=\{(d_1+d_2*x) \bmod 1031\} \bmod M$, wherein x is the input variable, y is the output variable, M is the number of base elements, and $d_1$ and $d_2$ are parameters determined based on a cell identification.

22. An apparatus for receiving data in a wireless communication system, comprising:
a receiving interface for receiving data and a seed number from the communication system;
a processor coupled with the receiving interface, the processor being configured to:
set, based on the seed number, at least one parameter for a pseudo-random mapper having an input variable and an output variable;
initialize an array with a number of base elements;
increase a current value of the input variable by a current value of a counter;
calculate a value of the output variable based on the pseudo-random mapper and the increased value of the input variable;
swap a first base element and a second base element in the array, the first base element being identified based on the current value of the counter, and the second base element being identified based on the value of the output variable;
perform permutation on resources allocated for the received data by using the array as a permutation sequence; and
de-allocate the resources allocated for the received data;
a memory device coupled with the processor for storing the received data; and
an output interface coupled with the processor to output the received data for further processing.

23. The apparatus of claim 22, wherein the processor is further configured to:
set the value of the output variable based on the current value of the counter, if the calculated value of the output variable is no less than the current value of the counter.

24. The apparatus of claim 22, wherein the processor is further configured to:
repeat, based on an updated value of the counter, operations of increasing the current value of the input variable, calculating the value of the output variable, and swapping the first base element and the second base element.

25. The apparatus of claim 22, wherein the processor is further configured to:
update the counter by decreasing the current value of the counter by a fixed number or by using a lookup table.

26. The apparatus of claim 22, wherein the processor is further configured to:
initialize the array with the number of base elements equal to a number of resource units, subcarriers, or tiles on which the permutation is to be performed.

27. The apparatus of claim 22, wherein the processor is further configured to:
implement the pseudo-random mapper as $y=\{(d_1*x+d_2) \bmod 1031\} \bmod M$, or as $y=\{(d_1+d_2*x) \bmod 1031\} \bmod M$, wherein x is the input variable, y is the output variable, M is the number of base elements, and $d_1$ and $d_2$ are parameters determined based on a cell identification.

28. The apparatus of claim 22, being a mobile station or a subscriber station.

29. A method for data transmissions in a wireless communication system, comprising:
allocating resources for data to be transmitted;
initializing an array with a number of base elements, the array having a plurality of indexes each corresponding to a location in the array;
selecting a first set of indexes from the plurality of indexes;
selecting a second set of indexes from the plurality of indexes;
randomly or regularly determining a first index from the first set of indexes;
randomly determining a second index from the second set of indexes;
swapping a first base element and a second base element in the array, the first base element being identified based on the first index, and the second base element being identified based on the second index;
performing permutation on the allocated resources by using the array as a permutation sequence; and
transmitting the data.

30. A method for receiving data in a wireless communication system, comprising:
receiving data;
initializing an array with a number of base elements, the array having a plurality of indexes each corresponding to a location in the array;
selecting a first set of indexes from the plurality of indexes;
selecting a second set of indexes from the plurality of indexes;
randomly or regularly determining a first index from the first set of indexes;
randomly determining a second index from the second set of indexes;
swapping a first base element and a second base element in the array, the first base element being identified based on the first index, and the second base element being identified based on the second index;
performing permutation on resources allocated for the received data by using the array as a permutation sequence; and
de-allocating the resources allocated for the received data.

* * * * *